Figure 1:
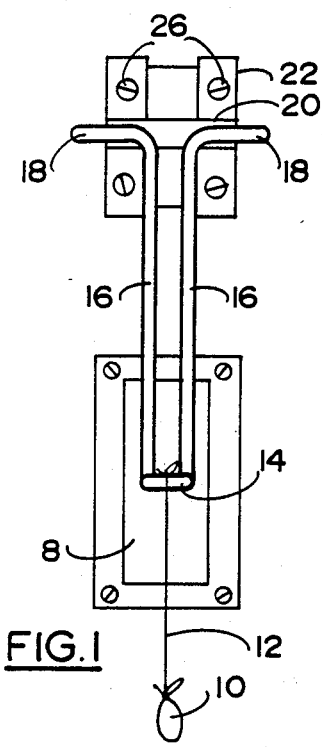

United States Patent [19]

Gunoff

[11] Patent Number: 4,908,484
[45] Date of Patent: Mar. 13, 1990

[54] DOORBELL ACTIVATING DEVICE FOR PETS

[76] Inventor: Gordon E. L. Gunoff, R.R. #2, Saskatoon, Saskatchewan, Canada, S7K 3J5

[21] Appl. No.: 234,172

[22] Filed: Aug. 19, 1988

[51] Int. Cl.$^4$ .......................................... H01H 17/20
[52] U.S. Cl. .................. 200/331; 119/29.5; 200/332
[58] Field of Search .............. 200/331, 332, 543, 545; 119/29, 29.5

[56] References Cited

U.S. PATENT DOCUMENTS

| | | | |
|---|---|---|---|
| 574,247 | 12/1896 | Jepson | 200/331 X |
| 2,296,000 | 9/1942 | Ojalvo | 119/29.5 |
| 2,655,122 | 10/1953 | Adams | 119/29 |
| 2,909,771 | 0/1959 | Minnich | 340/392 |
| 3,031,546 | 0/1962 | Williams | 200/61.62 |
| 3,964,058 | 0/1976 | Winston | 340/330 |
| 3,991,415 | 0/1976 | Barr, Sr. | 340/541 |
| 4,221,946 | 9/1980 | Halstrum | 200/331 |
| 4,323,883 | 0/1982 | Sowards | 340/328 |
| 4,414,921 | 11/1983 | Cozzi | 119/29 |

FOREIGN PATENT DOCUMENTS

| | | | |
|---|---|---|---|
| 60241 | 3/1891 | Fed. Rep. of Germany | 200/331 |
| 632766 | 1/1928 | France | 200/545 |
| 933435 | 4/1948 | France | 200/331 |

Primary Examiner—Renee S. Luebke

[57] ABSTRACT

A doorbell ringing device for pets. Consisting of a movable device to be hung respectively on the outer surface of a house or other building for yieldable movement under the impetus of a pets clawing or scratching thereagainst, activating a electrical switch, which provides a audible means to indicate that the animal desires ingress.

7 Claims, 1 Drawing Sheet

DOORBELL ACTIVATING DEVICE FOR PETS

This invention relates to a new and useful simplified improvement of a pet doorbell activating device to signal the occupant of a building that the pet requires ingress to that building.

This alleviates the necessity of leaving doors open for their use, which is wasteful in energy costs, it also will protect the pet from inclement weather. Previous devices require cutting and alterations which will deface the doors of a building which may not be desirable to the occupant. This device can be mounted easily and upon removal leaves small holes to be filled The principle object of the present invention is the provision of the device to take advantage of the natural characteristics of animals to claw, scratch and pull on an object which has a scent alluring to them. To this end the present invention includes an object containing an alluring scent fastened to the end of flexible cord which in turn is connected to a device hung above a doorbell switch. When a pet pulls on the device the force is transferred to exert pressure on the doorbell switch which will signal the occupant that the pet desires ingress to the building. Other objects are simplicity, economy of construction, efficiency and dependability of operation. With this object in view as well as other objects which will appear in the course of the specification reference will be had to the accompanying drawing wherein:

FIG. 1: is a frontal view of a doorbell switch showing a doorbell ringing device for pets as contemplated by the present invention mounted operatively thereon.

Figure 2:
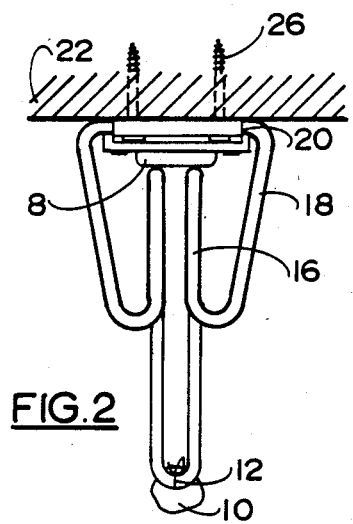

FIG. 2: is a side view of FIG. 1.

Figure 3:
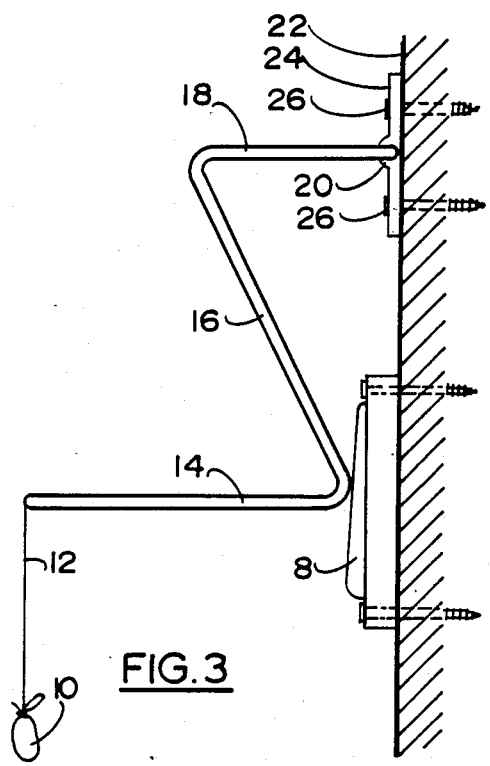

FIG. 3: is a top view of FIG. 1.

Like reference numerals apply to similar parts throughout the several views, and the numeral 8 applies to an existing doorbell switch mounted on a building. A scented receptacle of cloth or other suitable material 10 hung at a desirable height so a pet will be able to pull on said receptacle 10 that is attached by a flexible cord 12 to the end of a lever device 14 of metal or other suitable material, which is hinged at 20 by a plate 24 of metal or other suitable material, fastened by devices 26 which may be screws or nails, to secure them to the building surface 22 over an existing doorbell switch 8. Inward movement caused by a force downward on the receptacle 10 will be transferred by cord 12 to activate the building doorbell through a movement inward of the device system 14 closing the existing doorbell pushbutton switch 8 activating an audible signal to indicate to the occupant of a pet desiring ingress.

The receptacle 20 for the lever comprises a sleeve defining a horizontal axis. The sleeve receives the ends of a wire loop member forming the lever 14. The lever 14 includes a horizontal portion, an upwardly and outwardly inclined portion 16 and a substantially horizontal portion 18 connected to the ends of the wire. The pulling action on the outer end of the lower horizontal portion of the lever causes the lever to pivot about the ends of the wire within the receptacle 20 so that the junction between the inclined portions 16 and the lower horizontal portion compresses the switch 8 to generate the audible signal.

What I claim is new and desire to protect by Letters Patent is:

1. An activating device for use by a pet in actuating a conventional doorbell switch arranged on a building at a height suitable for a human, the device comprising a wire loop member movable to exert pressure against the doorbell switch, a plate member having a sleeve portion thereon defining a receptacle for receiving ends of said wire loop member for mounting said wire loop member on a building at a position adjacent said switch, said ends being arranged in coaxial relationship in said sleeve portion for providing pivotal movement of said wire loop member about an axis defined by said sleeve from a first position in which the switch is not actuated to a second position in which the switch is actuated, said wire loop member including pull means thereon arranged such that a vertically downward pull applied thereto causes the wire loop member to move to the second position, a flexible cord attached to said pull means of a length to extend from the wire loop member to a lower end at a position adjacent the ground, and grasping means for attachment to the lower end for grasping by the pet.

2. The invention according to claim 1 wherein the grasping means comprises a receptacle for receiving an alluring scent.

3. The invention according to claim 1 wherein said wire loop member includes a first portion for engaging the doorbell and wherein said pull means comprises a lever connected to the first portion and arranged to extend outwardly from the building to apply a lever action on the first portion when pulled vertically downwardly.

4. The invention according to claim 3 wherein the wire loop member comprises a second portion for pivotally mounting on said building, said first portion arranged to extend downwardly and inwardly from said second portion toward the doorbell switch and said lever arranged to extend directly outwardly in a horizontal direction from said first portion.

5. A doorbell for a pet comprising a doorbell switch mounted on a building at a height suitable for normal actuation by a human, means movable to exert pressure against the doorbell switch, a support member, means for mounting the support member on the building at a position adjacent to and above said switch, said support member carrying said movable means for pivotal movement from a first position in which the switch is not actuated to a second position in which the switch is actuated, said movable means including pull means thereon arranged such that a vertically downward pull applied thereto causes the movable means to move to the second position, a flexible cord attached to said pull means of a length to extend from the movable means to a lower end at a position adjacent to but spaced from the ground, and grasping means on the lower end for grasping by the pet, said movable means comprising a wire loop having a first portion engaging the doorbell and a second portion including ends of the wire loop turned inwardly to lie parallel to the building and mounted on said support member for said pivotal movement relative thereto, said pull means comprising a lever connected to the first portion with said first portion extending downwardly and inwardly from said second portion toward the doorbell switch and said lever extending directly outwardly in a horizontal direction from said first portion to apply a lever action on the first portion when said lever is pulled vertically downwardly.

6. The invention according to claim 5 wherein the grasping means comprises a receptacle for receiving an alluring scent.

7. The invention according to claim 5 wherein the support member comprises a plate attached to the building and a sleeve portion defining a receptacle for the ends of the wire loop to allow said pivoting movement thereof.

* * * * *